(12) United States Patent
Bergerson et al.

(10) Patent No.: US 8,032,742 B2
(45) Date of Patent: Oct. 4, 2011

(54) DYNAMIC UPDATING OF TRUSTED CERTIFICATES AND CERTIFICATE REVOCATION LISTS IN A COMPUTING SYSTEM

(75) Inventors: Robert L. Bergerson, Blaine, MN (US); James R. Heit, Vadnais Heights, MN (US); Jason C. Schultz, Plymouth, MN (US)

(73) Assignee: Unisys Corporation, Blue Bell, PA (US)

( * ) Notice: Subject to any disclaimer, the term of this patent is extended or adjusted under 35 U.S.C. 154(b) by 488 days.

(21) Appl. No.: 12/328,934

(22) Filed: Dec. 5, 2008

(65) Prior Publication Data
US 2010/0146250 A1  Jun. 10, 2010

(51) Int. Cl.
*H04L 29/06* (2006.01)
(52) U.S. Cl. .................. 713/155; 713/153; 713/150
(58) Field of Classification Search .................. 713/155, 713/153, 150
See application file for complete search history.

(56) References Cited

OTHER PUBLICATIONS

Reducing the Cost of Session Key Establishment ; Bruhadeshwar, B.; Kothapalli, K.; Deepya, M.S.; Availability, Reliability and Security, 2009. ARES '09. International Conference on Publication Year: 2009 , pp. 369-373 ; IEEE Conferences.*
QoS-aware optimization strategy for security ranking in SSL protocol; Fang Qi; Zhe Tang; Guojun Wang; Jie Wu; Mobile Adhoc and Sensor Systems, 2009. MASS '09. IEEE 6th International Conference on; Publication Year: 2009 , pp. 842-847.*
Runtime Security Adaptation Using Adaptive SSL ; Lamprecht, C.J.; van Moorsel, A.P.A.; Dependable Computing, 2008. PRDC '08. 14th IEEE Pacific Rim International Symposium on; Publication Year: 2008 , pp. 305-312; IEEE Conferences.*

* cited by examiner

*Primary Examiner* — David Y Jung
(74) *Attorney, Agent, or Firm* — Robert P. Marley

(57) ABSTRACT

This application generally describes techniques for dynamically updating trusted certificates and CRLs, generally referred to herein as certificate information. That is, techniques are described for updating trusted certificates and CRLs without terminating existing communication sessions. An exemplary method includes the steps of receiving an initial configuration that includes a trusted certificate authority, receiving certificate information that includes a certificate revocation list (CRL) and a first certificate from the trusted certificate authority, storing the certificate information in the configuration, initiating a communication session for an application, receiving an update to the certificate information, and updating the configuration to reflect the update to the certificate information without terminating the communication session. A computing device may receive the update to the certificate information from a user, as well as receiving a command from the user to apply the update to the certificate information to current communication sessions.

20 Claims, 9 Drawing Sheets

DYNAMIC UPDATING OF TRUSTED CERTIFICATES AND CERTIFICATE REVOCATION LISTS IN A COMPUTING SYSTEM

TECHNICAL FIELD

The invention relates to computer networking and, more particularly, to implementing communications protocols in a software system.

BACKGROUND

An application programming interface (API) is a set of functions and procedures provided by an operating system to higher-level software applications executing within a computer system. APIs provide the software application with the ability to interact with the operating system and lower-level system utilities and services implemented by the operating system. One important service typically implemented in the operating system is the ability to communicate over a computer network. An API that provides access to these network services may be referred to as a network interface API. Network interface APIs are provided by the operating system to provide higher-level software applications with the ability to communicate with other software applications running on different computing systems reachable by the computer network. Operating systems generally implement a network stack conforming to the Open Systems Interconnection (OSI) reference model in order to provide a plurality of layered networking protocols to enable this communication. One common form of a network stack conforms to the TCP/IP model in which the Transmission Control Protocol (TCP) is utilized within the transport layer of the network stack while the Internet Protocol (IP) is utilized in the Internet layer.

Some network protocols are designed to provide secure communications over a network. One such networking protocol is the Secure Socket Layer (SSL) protocol. Another such networking protocol is the Transport Layer Security (TLS) protocol. The SSL protocol generally provides secure communication over the network, even if the network itself is insecure, using asymmetric key cryptography to transmit a symmetric key that two parties to a communication session may use thereafter to encrypt session data. In this manner, the two parties exchange a symmetric key without the symmetric key being intercepted by a third party. Asymmetric key cryptography typically requires the use of public key and private key pairs. Each computer participating in the SSL protocol maintains a secret private key, while also distributing an associated public key to other computers on the network. Public keys may be distributed within a digital certificate. The certificate may include other information in addition to the public key, such as a computer identifier and an identifier for a trusted certificate authority. Network applications may use an API that is provided by an implementation of SSL (referred to herein as an SSL API) to create and maintain a secure connection over a computer network. Typically, each application running on a computer initiates a unique SSL session through the SSL API.

In many cases, two communicating parties may each not know whether the other party can or should be trusted. As a result, it is common to use a certificate authority, which is an entity that issues digital certificates and operates as a trusted third party of each of the two communicating parties. The certificate authority issues a certificate to each of the two communicating parties to indicate that the two parties are trustworthy. The certificate authority also issues certificate lists that include identifiers of trusted parties.

In operation, a certificate authority typically maintains a certificate revocation list (CRL) which is a list of certificates that have been revoked or are no longer valid and, therefore, should not be relied upon. A certificate authority may, for example, revoke a certificate upon discovering that the entity to which the certificate was issued failed to comply with certain policies. Other reasons for revoking a certificate include revocation when the private key has been compromised, the certificate has been superseded by another certificate, privileges for the individual have been withdrawn and the like. The certificate authority republishes the CRLs periodically or immediately upon revocation of one or more certificates. The other parties may then refuse to initiate or continue communication with the distrusted party.

When implementing a secure communication session, a computing device verifies that the digital certificate of the other party is valid by reference to internally stored copies of certificate lists and CRLs. The computing device implementing SSL or other secure communication protocols generally store certificates, certificate lists, and CRLs in one or more files or databases. Generally, when a new certificate or CRL is received, the computing device terminates all current network communication sessions, updates its certificate lists and/or CRLs in its files or databases, and then allows network communication to restart. The network entity may typically receive updates to certificates and CRLs from a certificate authority.

SUMMARY

In accordance with one aspect of this disclosure, techniques are described herein that provide a mapping between multiple, layered application programming interfaces (APIs) for the same secure network communications protocol utilized within one layer of the network stack. For example, an operating system of a computing device may internally implement a first version of the secure communication protocol that presents a first set of APIs. An emulation environment of the computing device is used to emulate a second implementation of the network security protocol and present a second set of APIs to higher-level software applications executing on the computing device, where the second set of APIs conforms to the second version of the same secure network communication protocol.

As one example, an SSL emulation environment executing on the computing device is used to implement and present to the higher-level software applications a first secure socket layer (SSL) API. This allows the high-level software application to conform to and directly invoke the first SSL API of the SSL emulation environment. The operating system provides a mapping of the emulated SSL implementation to a second SSL API, where the second SSL API is provided by an internal SSL implementation utilized by a network stack of the operating system when establishing secure network communications. This allows the operating system to utilize its internal implementation of the SSL protocol without requiring that the upper-level software applications be modified so as to conform to the particular API of the specific SSL implementation of the operating system. Instead, the upper-level software applications executing on the computer continue to utilize the SSL APIs presented by the by the SSL emulation environment. As one example, the SSL API presented to the higher-level software applications by the emulation environment may conform to an API of a proprietary SSL implementation or an API of an SSL implementation that is typically provided by an industry-standard operating system such as Microsoft Windows, MAC OS X, Unix, Linux, or other commonly used operating system. The underlying SSL implementation of the operating system to which SSL API of the emulation environment is mapped may be a proprietary SSL implementation or an open source implementation, such as OpenSSL.

In accordance with another aspect of this disclosure, techniques are described herein that relate to a communication interface process, interacting with an emulated SSL implementation, that is capable of maintaining a plurality of SSL connections for a plurality of applications. Rather than forcing each software application to create an individual SSL connection, techniques are described herein whereby a software application informs an emulated SSL implementation that the application needs a secure connection. The emulated SSL implementation then interacts with a communication interface process that performs the tasks associated with initializing an SSL connection. The communication interface process maintains a plurality of contexts, each associated with one of a plurality of applications running in the emulation environment.

In accordance with another aspect of this disclosure, techniques are described herein for receiving an update to a certificate revocation list (CRL) and applying the update to a current communication session without terminating the communication session. A software application executing on a computing device may request to initiate a communication session with another computing device over a network using, for example, an SSL implementation of a communication suite of software provided by the computing device, such as a library of secure communication APIs provided by an operating system of the computing device. The communication suit may utilize an initial configuration of security information (e.g., digital certificates and one or more CRLS) for initiating and establishing the secure communication session with the other computing device. That is, to begin any communication session, the communication suite checks the CRL to determine whether the other computing device over the network has had its certificate revoked. During the communication session, the computing device receives an update to the CRL associated with the communication suite. For example, an administrative user may request installation of a replacement CRL recently published or modify the CRL by adding, removing, or editing entries within the CRL with respect to any revoked digital certificates. In accordance with the principles described herein, the computer presents a user interfaces that allows the user to send a command to the communication suite to update the CRL while the communication session(s) is in progress and without requiring that any existing communication session(s) be torn down or stalled.

To ensure that the communication session does not need to be terminated in order to apply the update to the CRL, the communication suite stores and maintains context data for the active communication session. The context data includes, for example, a trusted certificate authority associated with the communication session, a session identifier, a public/private key pair for the communication session, a symmetric key for the session, and data retrieved from the CRL that was initially checked when the session was established. When the communication suite receives a notice that a CRL has been updated, the communication suite creates a second context by duplicating the first context so as to include the information of the first context, and applying the update to the CRL directly to the second context. That is, for data that stays the same after the CRL update, the data of the second context stays the same. However, where data has changed due to the CRL update, the second context includes data that reflects the change of the CRL update. In particular, any data that changes as a result of the CRL update is reflected in the second context.

Once the second context is created, the communication suite utilizes the second context to apply the second context to the existing communication sessions, instead of the first context. In one embodiment, the communication suite marks the existing communication session for CRL rechecking, causing the computing device to recheck the CRL when data is subsequently communicated over the existing communication session, and when a certificate for the communication session is revoked in accordance with the update to the CRL, the computing device terminates the existing communication session. In this manner, the communication suite applies an update to, e.g., a CRL or a digital certificate to an existing communication session without terminating the communication session.

In one embodiment, a method includes receiving, with a computer, an initial configuration that specifies a trusted certificate authority, receiving digital certificate information that includes a certificate revocation list (CRL) and a digital certificate issued by the trusted certificate authority, storing the certificate information in the configuration of the computer, with the digital certificate, initiating a secure communication session for a software application executing on the computer, receiving, with the computer, an update to the certificate information, and updating the configuration to reflect the update to the certificate information without terminating the communication session.

In another embodiment, a computing device includes a communication suite that includes an implementation of the secure socket layer (SSL) protocol and an application programming interface (API) for the implementation of the SSL protocol, and an application that interacts with the SSL API to initiate a communication session in accordance with the SSL protocol, wherein the communication suite maintains a first context for the communication session of the application when the communication session is initiated, wherein the first context includes certificate information that includes a certificate revocation list (CRL) and a certificate, and wherein the communication suite receives an update to the certificate information and applies the update to the certificate information without terminating the communication session.

In one embodiment, a method includes receiving, with a computer, an initial configuration that specifies a trusted certificate authority, receiving digital certificate information that includes a certificate revocation list (CRL) and a digital certificate issued by the trusted certificate authority, storing the certificate information in the configuration of the computer, with the digital certificate, initiating a secure communication session for a software application executing on the computer, receiving, with the computer, an update to the certificate information, and updating the configuration to reflect the update to the certificate information without terminating the communication session.

The techniques described herein may provide several advantages. For example, the techniques described herein may enable a communication suite to apply an update to a CRL without forcing termination of any existing, active secure communication sessions that make use of digital certificates associated with the CRL. In this manner, a user may have greater control over when an update to a CRL is applied. As updates to CRLs may be applied without terminating any of a plurality of communication sessions, this may lead to increased productivity for a computing device, as well as for other computing devices in communication with the computing device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
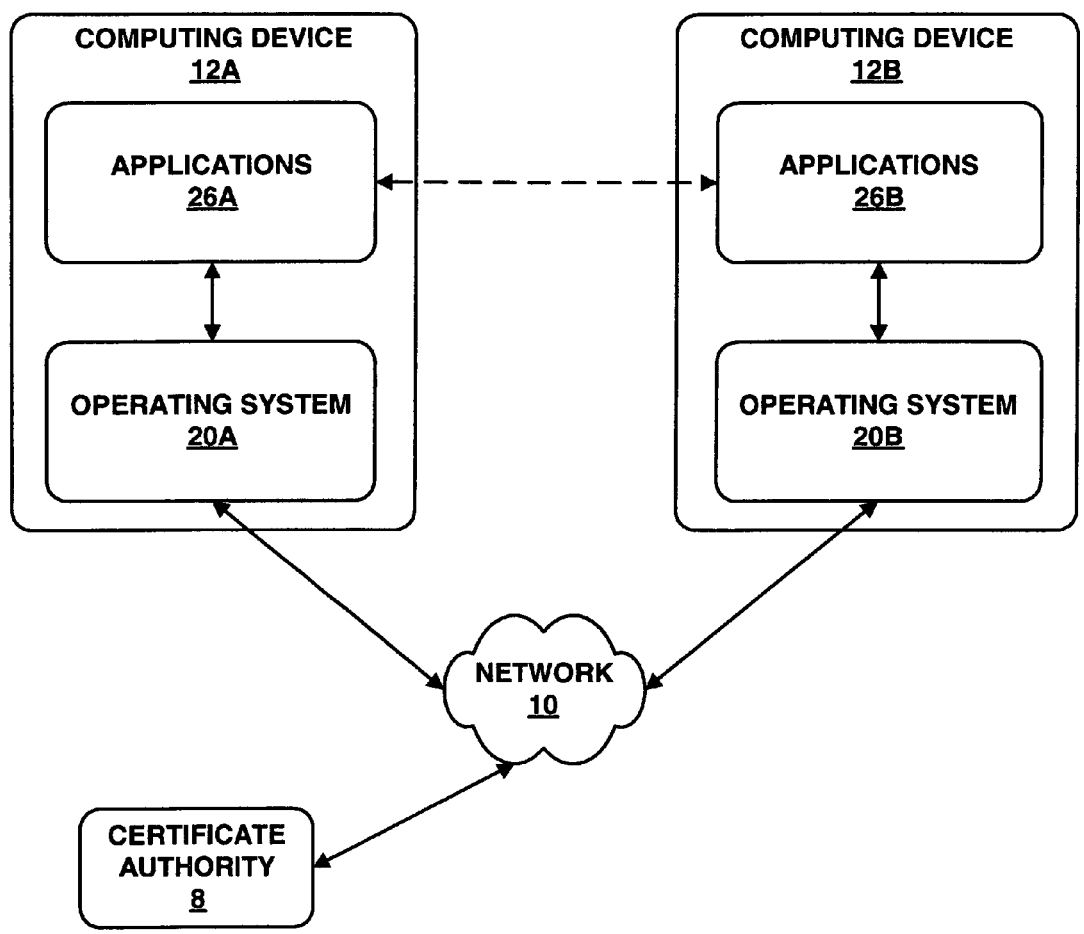
FIG. 1 is a block diagram illustrating a first computing device in secure communication with a second computing device over a network.

FIG. 1 is a block diagram illustrating an exemplary computing device 12A in secure communication with exemplary computing device 12B over network 10. Exemplary computing device 12A includes operating system 20A. Operating system 20A presents to higher-level software applications 26A an application programming interface (API) (not shown in FIG. 1) for establishing secure communication sessions over network 10. Similarly, operating system 20B presents to higher-level software applications 26B an API (not shown in FIG. 1) for establishing secure communication sessions over network 10. In this manner, from the perspective of applications 26A, applications 26A communicate directly with applications 26B.

In the example of FIG. 1, operating systems 20A and 20B implement a plurality of layered networking protocols that generally conform to the Open Systems Interconnection (OSI) reference model in order enable this communication For example, operating systems 20A and 20B implement network stacks that conform to the TCP/IP model in which the Transmission Control Protocol (TCP) is utilized within the transport layer of the network stack while the Internet Protocol (IP) is utilized in the Internet layer. In addition, operating systems 20A, 20B implement one or more network protocols designed to provide secure communications over a network, such as the Secure Socket Layer (SSL) protocol.

Operating systems 20A and 20B expose this functionality to higher-level software applications 26A and 26B, respectively, by way of application programming interfaces (APIs). One such API may be a secure socket layer (SSL) API for exposing procedures and functions of the underlying operating systems 26A, 28B for secure communication of data in accordance with the SSL protocol. As another example, one such API may be a transport level security (TLS) API. These functions and procedures provide applications, such as applications 26A, with the ability to send data via the TLS/SSL protocol as an encrypted transmission over a network, such as network 10. For example, an SSL API provides procedures to one of applications 26A that enable the one of applications 26A to securely initiate a connection, send and receive packets of data, request a digital certificate from another device connected to network 10, encrypt or decrypt data, authenticate the source of data, or to terminate a connection.

In some cases, a certificate authority, such as certificate authority 8, operates as a trusted third party that issues digital certificates. For example, certificate authority 8 may issue a digital certificate to an entity or user associated with computing device 12B, to indicate to another computing device, such as computing device 12A, that the entity or user is trustworthy and any communication using the issued digital certificate can be trusted. Certificate authority 8 maintains one or more certificate revocation lists (CRLs) that list of certificates that have been revoked or are no longer valid and, therefore, should not be relied upon. Certificate authority 8 may, for example, revoke a digital certificate upon discovering that the entity to which the certificate was issued failed to comply with certain policies or has reported that the private key associated with the digital certificate has been compromised. Certificate authority 8 republishes all or portions of the CRLs periodically or immediately in the form of a CRL update upon revocation of one or more certificates.

As described in further detail below, either or both of computing devices 12A, 12B implement techniques described herein that allow the computing devices to apply CRL updates, e.g., CRL updates from certificate authority 8, without requiring that current communication session be terminated.

In addition, computing device 12A (or optionally computing device 12B) may implement techniques described herein that allow the computing devices to present an API for a secure network communications protocol to applications 26A, where the API conforms to a different version of the protocol than a version implemented by operating systems 20A. For example, operating system 20A of computing device 12A may internally implement a first version of the secure network communication protocol (e.g., SSL) that presents a first set of APIs, where that first set of APIs are internally utilized the by operating system 20A and not exposed to applications 26A. Instead, an emulation environment provided by computing device 12A is used to emulate a second implementation of the secure network communications protocol and present a second set of APIs to software applications 26A executing on the computing device, where the second set of APIs conforms to the second version of the same secure network communications protocol.

Figure 2:
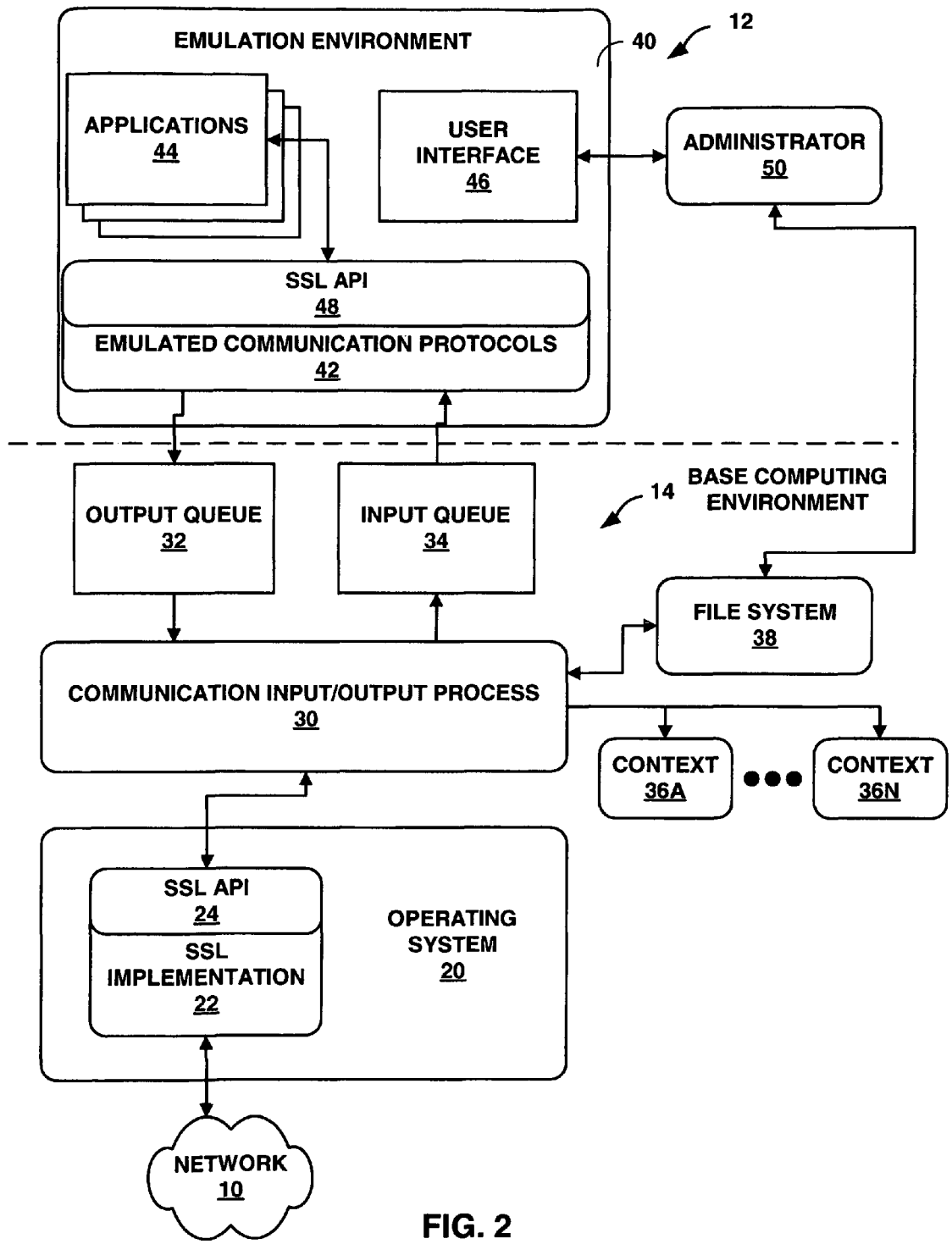
FIG. 2 is a block diagram illustrating an exemplary embodiment of a computing device including a first secure socket layer (SSL) application programming interface (API) and a second SSL API.

FIG. 2 is a block diagram illustrating an example embodiment of software executing on a processor of a computing device 12, where the software includes a first SSL API 48 and a second SSL API 24. Computing device 12 may, in one embodiment, correspond to computing device 12A of FIG. 1. Communication input/output process 30 and emulation environment 40 may, in one embodiment, correspond to one of higher-level software applications 26A of FIG. 1 executing on operating system 20A. That is, emulation environment 40 may be provided by a software process executed by operating system 20 of the computing device 12, where that particular software process provides emulation of a different operating system so as to present emulated communication protocols 42 having a first SSL API 48. A second SSL API 24 is provided by SSL implementation 22 of the actual (i.e., underlying) operating system 20 executed by the microprocessors and hardware computing platform of computer 20. In this way, emulation environment 40 may be a software application executing over operating system 20 of base computing environment 14 of computing device 12. In general, base computing environment 14 includes a processor and a memory (not shown), such that the memory stores instructions that, when executed, cause the processor to perform the functions described with respect to, for example, operating system 20.

Further, emulation environment 40 provides an operating environment for software applications 44 that were written for a particular operating environment, i.e., the particular operating system or particular APIs provided by the emulation environment. For example, those APIs may no longer be provided by a currently active operating system 20. For example, the operating system emulated by emulation environment 40 may no longer be directly supported by computer 12, the original software engineers who wrote the operating system, or may have been superseded by a newer version that does not include those APIs. In any case, emulation environment 40 emulates the operating system and/or corresponding APIs. That is, emulation environment 40 provides similar functionality to applications 44 as would be provided by an operating system. For example, emulation environment 40 implements APIs typically provided by an operating system.

Emulated communication protocols 42 implements and emulates one or more network communication protocols. In the example embodiment of FIG. 2, emulated communication protocols 42 emulates an implementation of the SSL protocol. Emulated communication protocols 42 also provide APIs, such as first SSL API 48, for use by applications 44. In this manner, the exemplary embodiment of computing device 12 is capable of providing the functionality required by applications 44 to continue operation of applications 44 in emulation environment 40, as opposed to an operating system or base computing environment, such as base computing environment 14 of FIG. 2. That is, applications 44 may operate within emulation environment 40, even if computing device 12 does not directly provide the operating system and APIs for which applications 44 were written. Therefore, if a user wishes to run one of applications 44 on computing device 12, but operating system 20 of computing device 12 does not support the APIs for which the one of applications 44 was written, the one of applications 44 may nevertheless operate on computing device 12 by executing in emulation environment 40 and interacting with, for example, first SSL API 48. As described below, base computing environment 14 seamlessly provides a mapping between SSL API 48 and SSL API 24 so that the secure network communications protocol utilized within a network stack of operating system 20 may be utilized without requiring modification of applications 44.

For example, communication input/output process 30 provides an interface between emulation environment 40 and operating system 20. Communication input/output process 30 may also be referred to as a communication interface process, due to its provision of this interface. When one of applications 44 requests, for example, a procedure emulated by emulated communication protocols 42 through first SSL API 48, emulated communication protocols 42 sends data to communication input/output process 30, which interprets the data to make a corresponding procedure call to second SSL API 24. Emulated communication protocols 42 sends data to communication input/output process 30 in the form of a packet, which may include a connection identifier (connection ID). Second SSL API 24, in turn, performs the procedure and, if necessary, sends resulting data to communication input/output process 30, which packages the resulting data into a packet and sends the packet to the emulated implementation of SSL of emulated communication protocols 42. First SSL API 48, in turn, returns the data to the appropriate one of applications 44.

In addition, communication input/output process 30 initializes SSL implementation 22. Initially, communication input/output process 30 initializes SSL implementation 22 by, for example, making a call to a corresponding SSL library, such as the OpenSSL library, to prepare the library for use. Communication input/output process 30 also instructs SSL implementation 22, through second SSL API 24, as to what secure algorithms are available, various features that are available such as cipher suites that are available, the location of one or more certificate files, the location of one or more certificate revocation list (CRL) files, the location of public and private key pairs, the location of collected public keys from other computing devices, initialize a random number generator, initializing error code strings, or other initialization procedures. In one embodiment, communication input/output process 30 makes calls to SSL implementation 22 to prepare SSL implementation 22 to execute in multiple threads as a multi-threaded process. For example, communication input/output process 30 may create and initialize semaphores or other data objects in preparation for the multi-threaded processes. In this manner, communication input/output process 30 initializes SSL implementation 22 only once for a plurality of communication sessions, rather than SSL implementation 22 requiring distinct initializations for each unique communication session.

In the exemplary embodiment of FIG. 2, emulated communication protocols 42 send data to output queue 32 and receive data from input queue 34 to communicate with communication input/output process 30. Emulated communication protocols 42 may interact with output queue 32 and input queue 34, in one embodiment, as if output queue 32 and input queue 34 were each half-duplex network ports. In general, output queue 32 and input queue 34 reside in a shared memory space of computing device 12, that is, a memory space shared both by operating system 20 and emulation environment 40, and act as a communicative bridge between emulation environment 40 and base computing environment 14. That is, output queue 32 and input queue 34 enable emulation environment 40 to send and receive data to and from base computing environment 14. In one embodiment, emulated communication protocols 42 package data sent to output queue 32 in the form of a network packet. In one embodiment, such a packet may have a proprietary format as described, for example, with respect to the exemplary packets of FIGS. 9 and 10. In one embodiment, the packet may be a standard network packet. In one embodiment, the packet includes a connection ID that is associated with the application, as well as the one of 36A-36N (contexts 36) associated with the communication session. In one embodiment, emulated communication protocols 42 receive data from input queue 34 in the form of a network packet.

SSL implementation 22 of operating system 20 implements the SSL protocol. That is, SSL implementation 22 provides the various functions and procedures to provide computing device 12 with the capability to communicate over SSL with other computing devices connected to network 10. For example, SSL implementation 22 implements SSL handshake procedures, key retrieval, certificate retrieval, public/private key pair generation, encryption and decryption procedures, data verification, and other procedures necessary for SSL communication. In one embodiment, SSL implementation 22 may comprise OpenSSL. In one embodiment, second SSL API 24 of SSL implementation 22 may be an API to interact with OpenSSL.

Communication input/output process 30 also maintains one or more contexts 36. In general, a context refers to information regarding a particular network connection or communication session between computing device 12 and another computing device connected to network 10. In particular, each of contexts 36 include various details regarding such a connection. For example, context 36A may include such information as a certificate list, a CRL, a public key, an identification of a certificate authority, a symmetric key in use for the communication session, an identification of the encryption protocol being used for the communication session, and other such information. Each of contexts 36 may also include a connection identifier (connection ID) that associates each of contexts 36 with a particular one of applications 44, or a particular communication session of applications 44. Communication input/output process 30 uses a connection ID from a packet from emulated communication protocols 42 to identify the one of contexts 36 associated with the communication session associated with the packet. Emulated communication protocols 42 use the connection ID to identify the one of applications 44 with which the packet is associated.

In one embodiment, each of contexts 36 relate to a particular network socket (not shown) of operating system 20. A context, such as context 36A, may include information as to the current state of the trusted certificates and CRLs. A context, such as context 36A, may also include connection status information, such as the current time, the last time a status request was made, the total number of bytes of input and output sent through SSL, the number of bytes of input and output sent through SSL since the last status update, and the current bitrate of the connection. In some embodiments, communication input/output process 30 may include a global trusted certificate list and/or a global CRL, each of which may be applied to each of contexts 36.

Because communication input/output process 30 maintains contexts 36, applications 44 may not be required to perform these or similar context maintenance operations. In this manner, applications 44 only need to use the proper procedure call provided by first SSL API 48 to initiate a communication session over network 10. The more difficult tasks of actually ensuring the initiation and maintenance of the communication session may be performed by communication input/output process 30 through interaction with second SSL API 24. Therefore, if second SSL API 24 needs to be changed, for example to adapt to a change in the SSL protocol or a change in SSL implementation 22, only communication input/output process 30 may need to be updated, rather than the necessity of updating each of applications 44. In one embodiment, communication input/output process 30 maintains a single SSL session with SSL implementation 22, such that a single SSL session exists to service a plurality of communication sessions of applications 44.

Administrator 50 may interact with computing device 12 through user interface 46. User interface 46 includes, for example, a computer monitor, a command line interface, a graphical user interface (GUI), a printer, a keyboard, a mouse, a security device such as a fingerprint scanner, and other hardware or software interfaces. Administrator 50 may perform various administrative tasks on computing device 12. For example, administrator 50 may initialize public and private key pairs, create or maintain passwords, load or manipulate trusted certificate lists, load or manipulate certificate revocation lists (CRLs), load or store encryption algorithms, enable or disable ports or sockets, or other administrative tasks.

According to another aspect of this disclosure, computing device 12 receives updated trusted certificate lists or CRLs, for example from a certificate authority such as certificate authority 8 (FIG. 1) or administrator 50. Upon receiving these updates, computing device 12 may need to apply the updates to current communication sessions and/or to future communication sessions. In one embodiment, administrator 50 configures a file, such as a file in file system 38 provided by base computing environment 14, to update the trusted certificates and/or CRLs. File system 38 may be included in computing device 12, or file system 38 may be accessible by computing device 12 (e.g., from across a network). File system 38 may store one or more files that include information regarding trusted certificate authorities, certificate lists, and CRLs.

Administrator 50 may further manipulate the files of file system 38. For example, administrator 50 may add or remove a trusted certificate authority, a certificate, or a CRL. When administrator 50 has finished configuring the files of file system 38, administrator 50 uses user interface 46 to send a command to update the certificates and CRLs of computing device 12. Emulation environment 40, in turn, causes emulated communication protocols 42 to send a message to communication input/output process 30 to update the certificates and CRLs of contexts 36. The message may include an identifier of a file for communication input/output process 30 to retrieve in order for communication input/output process 30 to make adjustments to contexts 36.

Communication input/output process 30 modifies one or more of contexts 36 in response to an update message from emulated communication protocols 42. Communication input/output process 30 may be able to retrieve and store data to and from file system 38. Communication input/output process 30 may retrieve an identifier of a file in file system 38. Communication input/output process 30 may then retrieve the file identified by the identifier from file system 38. In an alternative embodiment, emulated communication protocols 42 may retrieve the file from file system 38 and send the file to communication input/output process 30. In any case, communication input/output process 30 may use the file to update one or more of contexts 36.

In one embodiment, communication input/output process 30 uses information in the file retrieved from file system 38 for new ones of contexts 36 created for new communication sessions of applications 44. That is, rather than modifying the existing ones of contexts 36, communication input/output process 30 may use the file when creating new contexts when one of applications 44 initiates a new communication session through first SSL API 48. In another embodiment, communication input/output process 30 may use the file to update existing ones of contexts 36. In yet another embodiment, communication input/output process 30 may include one global context that applies to all communication sessions of applications 44 for certain information, such as trusted certificates and CRLs, and individual contexts for each communication session; communication input/output process 30 may therefore update the global context in accordance with the file from file system 38. In still another embodiment, communication input/output process 30 may maintain two or more global contexts of contexts 36 and, in communication session specific ones of contexts 36, an identifier as to which of the two or more global contexts to refer; communication input/output process 30 may then set the identifier of all new communication specific ones of contexts 36 to the most recent global context, thereby phasing out the old global contexts and removing the oldest global context when no more communication specific contexts refer to it. In this manner, communication input/output process 30 may update trusted certificate authorities, certificates, and CRLs without terminating existing communication sessions and without the necessity of a restart.

In one embodiment, SSL implementation 22 may be OpenSSL. In this exemplary embodiment, second SSL API 24 may provide procedures such as SSL_CTX_new( ), SSL_CTX_set_default_passwd_cb_userdata( ), SSL_CTX_set_default_passwd_cb( ), SSL_CTX_use_PrivateKey_file( ), SSL_CTX_use_certificate_chain_file( ), SSL_CTX_set_cert_store( ), SSL_CTX_set_cipher_list( ), or other procedures. Accordingly, in this example embodiment, communication input/output process 30 may call any or all of these procedures at various times to initiate or maintain a communication session and a corresponding one of contexts 36.

The example embodiment of computing device 12 may provide several advantages. For example, the use of a communication input/output process 30 may simplify the process of developing an application, such as one of applications 44, that maintains secure connections over SSL. That is, because the one of applications 44 does not need to handle the actual SSL initialization, because the actual initialization may be performed by communication input/output process 30, development of the one of applications 44 may be simplified to just calling procedures provided by first SSL API 48. Where the one of applications 44 was developed for an operating system that is no longer supported, an emulated version of the operating system may be created that provides emulation environment 40 and emulated communication protocols 42; the one of applications 44 may then be executed within emulation environment 40, which may prevent the necessity of rewriting the one of applications 44.

Figure 3:
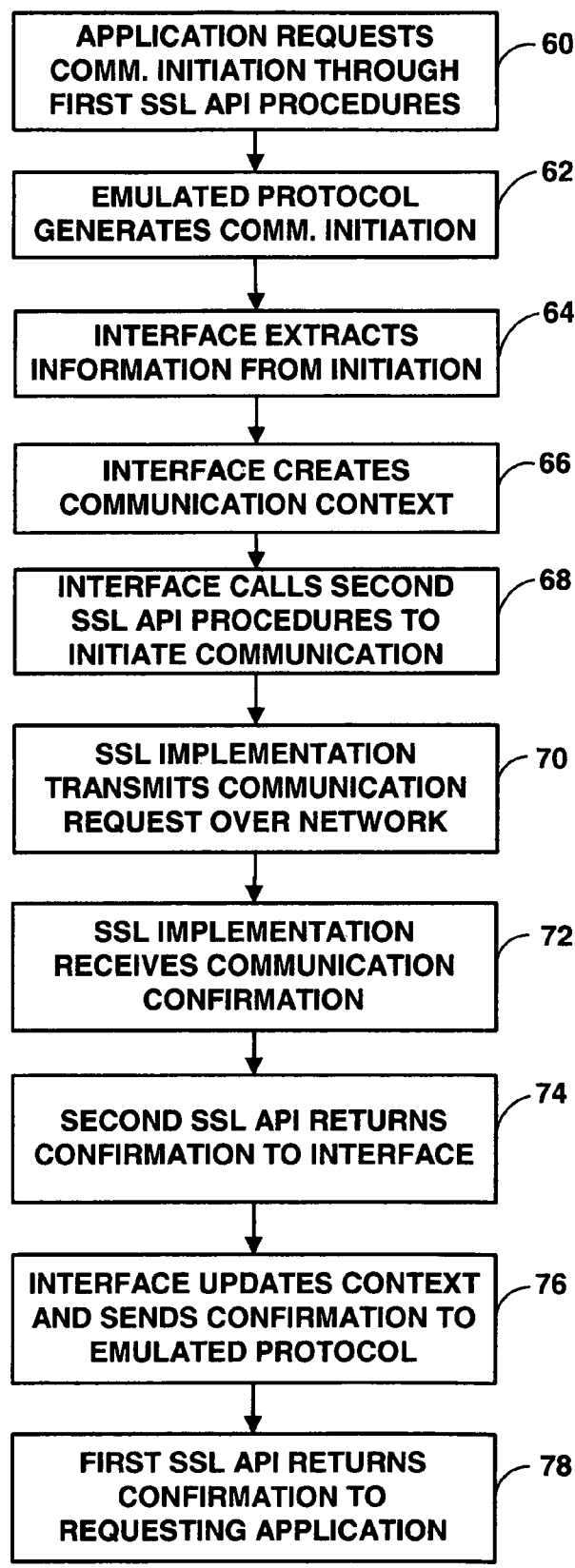
FIG. 3 is a flowchart illustrating exemplary steps for an application to initiate a communication session.

FIG. 3 is a flowchart illustrating exemplary steps for one of applications 44 to initiate a communication session. Initially, one of applications 44 requests to initiate a communication session through first SSL API 48 of emulated communication protocols 42 (60). Emulated communication protocols 42, in turn, creates a packet that includes data such as a name of a certificate file that includes one or more certificates, a cipher suite (those encryption protocols implemented by emulated communication protocols 42), a private key pair including a public key and a private key for asymmetric key cryptography, or other information. The packet may also include a connection identifier (connection ID) associated with the requesting one of applications 44. The cipher suite may include, for example, implementations of the data encryption standard (DES), triple DES, the advanced encryption standard (AES), Rivest Cipher 4 (RC4), RSA, the digital signature algorithm (DSA), Diffie-Hellman key exchange (DH), or other encryption algorithms. Emulated communication protocols 42 may further include in the packet a request to initiate communication over a network (62). Emulated communication protocols 42 further outputs this packet to output queue 32.

Communication input/output process 30 receives the data from output queue 32. In one embodiment, communication input/output process 30 receives data through output queue 32 in the form of a packet. Communication input/output process 30 then extracts data from the packet (64). From this extracted data, communication input/output process 30 forms a context, such as context 36A, associated with the communication session (66). For example, communication input/output process 30 may form context 36A to include information extracted from the packet, including a certificate, a list of available encryption protocols, a public key, a certificate list, a certificate revocation list (CRL), a session identifier such as a connection ID, state information, and other information.

Communication input/output process 30 then calls the procedures provided by second SSL API 24 to initiate a communication session (68). Second SSL API 24 may require different procedure calls and different data formats than first SSL API 48, therefore communication input/output process 30 invokes the procedure calls required to interact with second SSL API 24. SSL implementation 22, associated with second SSL API 24, may be a different implementation of the SSL protocol than emulated communication protocol 42. For example, SSL implementation 22 may be an OpenSSL implementation of SSL, and emulated communication protocol 42 may be an emulated, proprietary implementation of the SSL protocol, as shown in FIG. 2.

Upon receiving data and procedure calls from communication input/output process 30 through second SSL API 24, SSL implementation 22 initiates a communication session using with another computing device connected to network 10. That is, SSL implementation 22 transmits data over network 10 to request initiation of a communication session with another computing device (70). SSL implementation 22 may also obtain certificates and CRLs from a certificate authority, such as certificate authority 8 (FIG. 1).

Assuming that the communication session can begin properly, SSL implementation 22 receives a response from the computing device with which a communication session was requested (72). SSL implementation 22 then uses second SSL API 24 to return a communication initiation confirmation to communication input/output process 30 (74). Communication input/output process 30 modifies the created one of contexts 36 in accordance with data received in this confirmation. Communication input/output process 30 then packages the confirmation into a packet and send the packet to emulated communication protocols 42 through input queue 34 (76). Emulated communication protocols 42 then return a confirmation message to the requesting one of applications 44 (78). The requesting one of applications 44 has then established a communication session, and may send data in accordance with the exemplary method of FIG. 4 and receive data in accordance with the exemplary method of FIG. 5.

Figure 4:
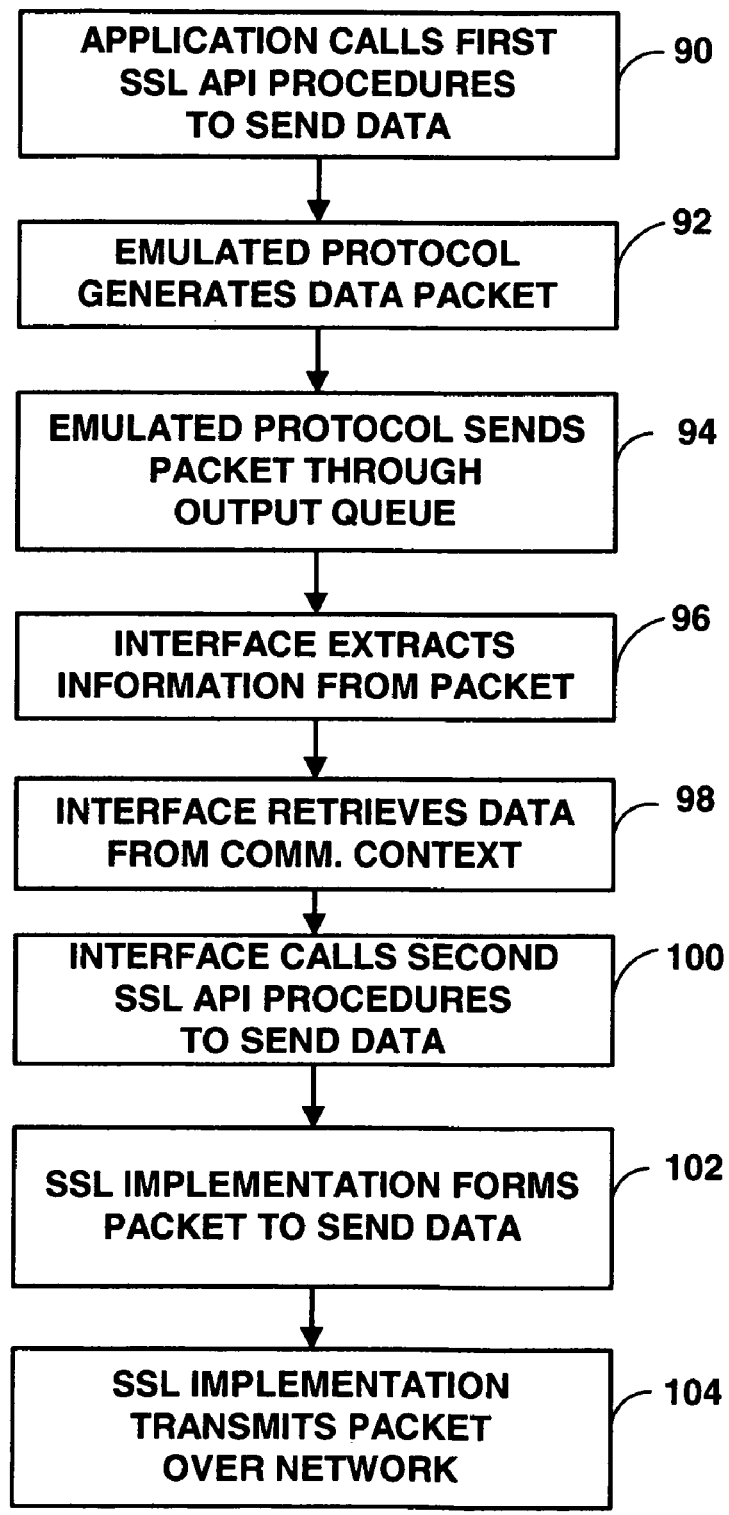
FIG. 4 is a flowchart illustrating exemplary steps for communicating data from an application over a network.

FIG. 4 is a flowchart illustrating exemplary steps for communicating data from one of applications 44 over network 10. After the one of applications 44 has established a communication session (for example, per the method described with respect to FIG. 3), the one of applications 44 may transmit data. Initially, the one of applications 44 uses procedures provided by first SSL API 48 to transmit data (90). Emulated network protocols 42, associated with first SSL API 48, receives the data to be transmitted through first SSL API 48, as well as other instructions relevant to the transmission of data, such as the destination for the data and an identifier for the one of applications 44. In the exemplary embodiment of FIG. 4, emulated network protocols 42 forms a packet from the data received from the one of applications 44 (92). Emulated network protocols 42 then send the data to output queue 32 (94).

Communication input/output process 30 receives the packet from output queue 32. Communication input/output process 30 then extracts information from the packet (96). Communication input/output process 30 uses data extracted from the packet to determine the source of the data, and accordingly may extract necessary information from the associated one of contexts 36 (98). For example, if the communication session for the one of applications 44 is related to context 36A, communication input/output process 30 may extract a symmetric key, a public key, or an encryption algorithm identifier from context 36A for later encryption of the data. Communication input/output process 30 then calls procedures provided by second SSL API 24 to transmit the data (100).

SSL implementation 22 receives the data through second SSL API 24. In addition to data sent from the one of applications 44, SSL implementation 22 receives an encryption algorithm identifier and one or more keys, such as a public key or a symmetric key. SSL implementation 22 uses all of the received information to generate a packet for transmission over network 10 (102). The information in the packet is encrypted in accordance with a selected encryption algorithm. SSL implementation 22 then transmits the encrypted packet over network 10 to the proper destination (104).

Figure 5:
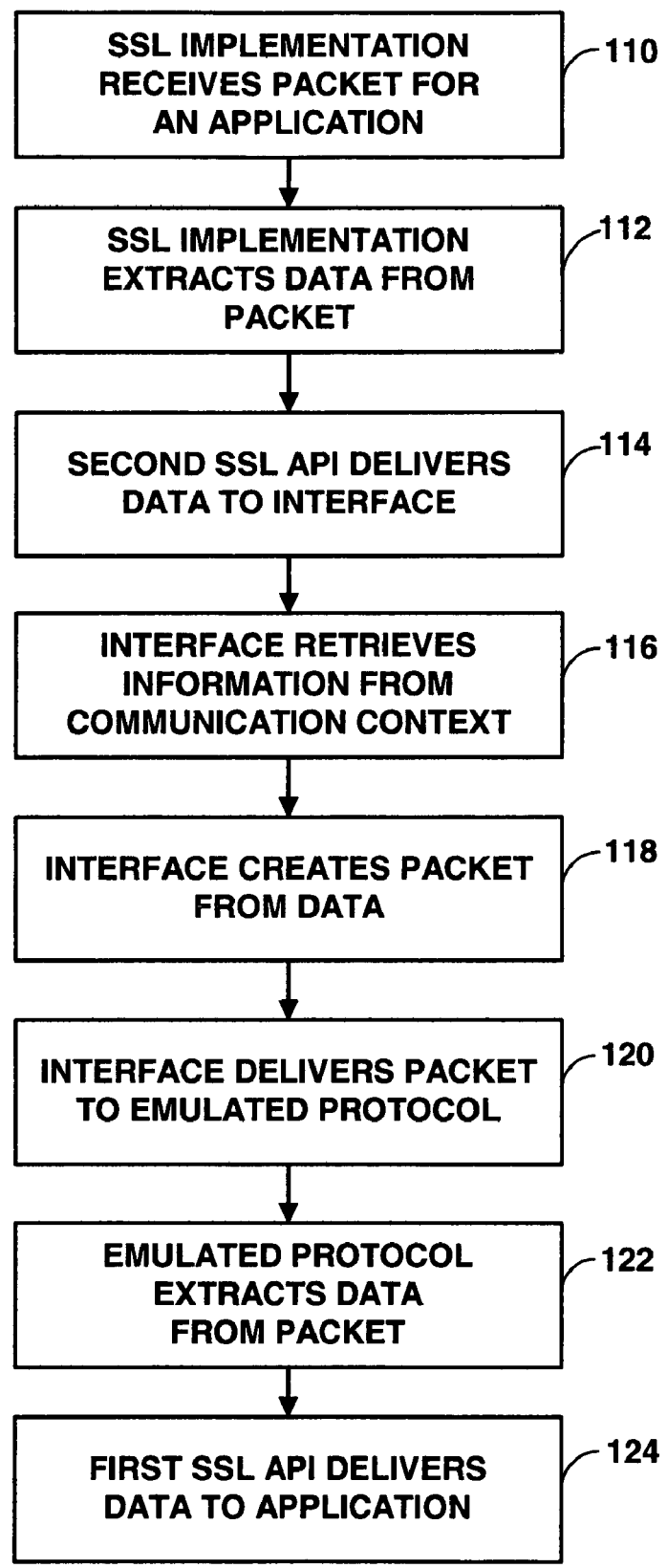
FIG. 5 is a flowchart illustrating exemplary steps for delivering data received from a network to an application.

FIG. 5 is a flowchart illustrating exemplary steps for delivering data received from network 10 to one of applications 44. Initially, SSL implementation 22 may receive some data from network 10 that is destined for an application, such as one of applications 44 (110). SSL implementation 22 receives this data from operating system 20, which may have received the data in the form of a packet from network 10. The packet may include an identifier of its destination as well as an identifier for a protocol by which to interpret the packet. In the example of FIG. 5, the packet includes an identifier of the SSL protocol. Operating system 20, in turn, passes the packet to SSL implementation 22.

SSL implementation 22 processes the packet in accordance with the SSL protocol. SSL implementation 22 extracts certain information from the packet (112). In the example of FIG. 5, SSL implementation 22 extracts an identifier from the packet that identifies the destination of the packet, such as one of applications 44. SSL implementation 22 send data from the packet to communication input/output process 30 through second SSL API 24 (114). Communication input/output process 30 retrieves information from the one of contexts 36 associated with the packet (116). SSL implementation 22 perform additional communicative steps with communication input/output process 30, not shown in FIG. 5, such as requesting from communication input/output process 30 context information from one of contexts 36 regarding the packet, such as a symmetric key, a private key corresponding to a public key, an encryption algorithm identifier, or other information in order to decrypt the packet, if necessary. SSL implementation 22 may also decrypt the packet using this extracted information before sending decrypted contents of the packet to communication input/output process 30.

Upon receiving decrypted contents of the packet, communication input/output process 30 creates a packet of a format required by emulated communication protocols 42 (118). Communication input/output process 30 may further update context information in the associated one of contexts 36, if necessary. For example, the received data may have included an update to a certificate, trusted certificate list, or a CRL. Communication input/output process 30 updates contexts 36 accordingly. Once communication input/output process 30 has formed the packet, communication input/output process 30 delivers the packet to emulated communication protocols 42 through input queue 34 (120).

Emulated communication protocols 42 disassemble the packet and extract information from the packet (122). For example, emulated communication protocols 42 may extract an identifier of the intended recipient among applications 44. Emulated communication protocols 42 then sends the extracted data to the appropriate one of applications 44 through first SSL API (124).

Figure 6:
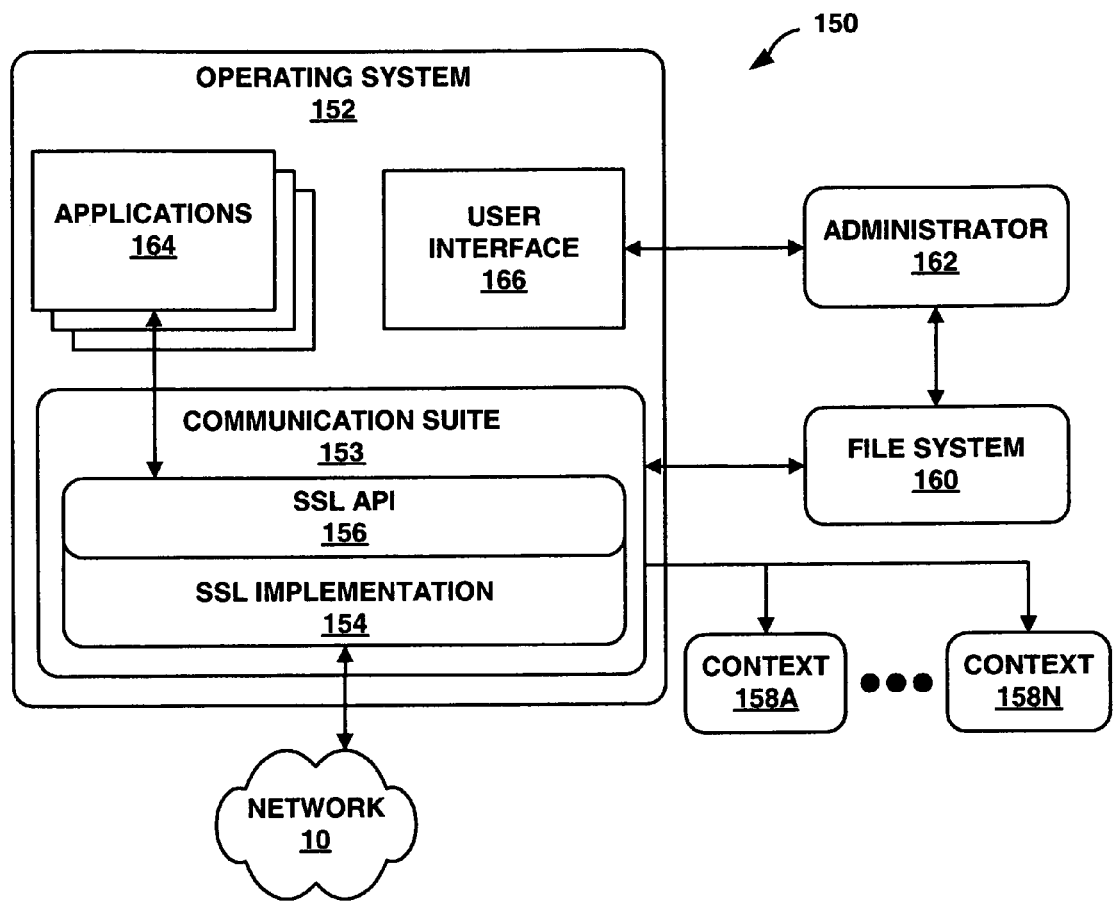
FIG. 6 is a block diagram illustrating an exemplary embodiment of a computing device presenting a user interface by which an administrator may configure an SSL implementation.

FIG. 6 is a block diagram illustrating an exemplary embodiment of computing device 150 that presents user interface 166 by which administrator 162 may configure communication suite 153. Communication suite 153 provides SSL implementation 154. Accordingly, administrator 162 may configure or modify the configuration of SSL implementation 154 using user interface 166.

In general, communication suite 153 provides SSL implementation 154, which is an implementation of the SSL protocol. SSL implementation 154 provides SSL API 156 to applications 164. Applications 164 may call procedures and functions of SSL API 156 to initiate SSL communication sessions with other computing devices on network 10. For example, in one embodiment, SSL implementation may be OpenSSL, and SSL API 156 may provide procedures that include SSL_CTX_new( ), SSL_CTX_set_default_passwd_cb_userdata( ), SSL_CTX_set_default_passwd_cb( ), SSL_CTX_use_PrivateKey_file( ), SSL_CTX_use_certificate_chain_file_( ), SSL_CTX_set_cert_store( ), SSL_CTX_set_cipher_list( ), or other procedures.

Applications 164 execute on operating system 152. Operating system 152 may provide other APIs (not shown) for applications 164 as well, such as operations to read and write data, retrieve user input, send output, interact with computing resources, or operating system functions.

Communication suite 153 may also maintain one or more contexts 158A-158N (contexts 158). In general, a context refers to information regarding a particular network connection or communication session between one of applications 164 and another computing device connected to network 10. In particular, each of contexts 158 include various details regarding such a communication session. For example, context 158A may include such information as a certificate list, a CRL, a public key, an identification of a certificate authority, a symmetric key in use for the communication session, an identification of the encryption protocol being used for the communication session, and other such information. Each of contexts 158 may also include a connection identifier (connection ID) that associates each of contexts 158 with a particular one of applications 164, or a particular communication session of applications 164. In one embodiment, communication suite 153 implement a table to store associations between applications 164 and corresponding ones of contexts 158, using the connection ID.

Administrator 162 interacts with computing device 150 through user interface 166. User interface 166 may include, for example, a computer monitor, a command line interface, a graphical user interface (GUI), a printer, a keyboard, a mouse, a security device such as a fingerprint scanner, and other hardware or software interfaces. Administrator 162 may perform various administrative tasks on computing device 150. For example, administrator 50 may initialize public and private key pairs, create or maintain passwords, load or manipulate trusted certificate lists, load or manipulate certificate revocation lists (CRLs), load or store encryption algorithms, enable or disable ports or sockets, or other administrative tasks.

Moreover, computing device 150 may receive updated trusted certificate lists or CRLs, for example from a certificate authority such as certificate authority 8 (FIG. 1). Computing device 150 may also receive these updates from a user, such as administrator 162. Upon receiving these updates, computing device 150 applies the updates to current communication sessions and/or to future communication sessions. In one embodiment, administrator 162 may configure a file, such as a file in file system 160, to update the trusted certificates and/or CRLs. File system 160 may be included in computing device 150, or file system 160 may be otherwise accessible by computing device 150. File system 160 stores one or more files that include information regarding trusted certificate authorities, certificate lists, and CRLs.

Administrator 162 may further manipulate the files of file system 160. For example, administrator 162 may add or remove a trusted certificate authority, a certificate, or a CRL. When administrator 162 has finished configuring the files of file system 160, administrator 162 uses user interface 166 to send a command to communication suite 153 to update the certificates and CRLs of SSL implementation 154. User interface 166 sends a message to communication suite 153 to update certificates and CRLs of contexts 158. The message may include an identifier of a file for communication suite 153 to retrieve in order for communication suite 153 to make adjustments to contexts 158.

Communication suite 153 modifies one or more of contexts 158 in response to an update message from operating system 152. Communication suite 153 retrieves and stores data to and from file system 160. Communication suite 153 may retrieve an identifier of a file in file system 160. Communication suite 153 then retrieves the file identified by the identifier from file system 160. Communication suite 153 uses the file to update one or more of contexts 158.

In one embodiment, communication suite 153 uses information in the file retrieved from file system 160 for new ones of contexts 158 created for new communication sessions of applications 164. That is, rather than modifying the existing ones of contexts 158, communication suite 153 may use the file when creating new contexts 158 when one of applications 164 initiates a new communication session through SSL API 156. In another embodiment, communication suite 153 may use the file to update existing ones of contexts 158. In yet another embodiment, communication suite 153 may include one global context of contexts 158 that applies to all communication sessions of applications 164 for certain information, such as trusted certificates and CRLs, and individual contexts of contexts 158 for each communication session; communication suite 153 may therefore update the global context in accordance with the file from file system 160. In still another embodiment, communication suite 153 may maintain two or more global contexts of contexts 158 and, in individual communication session specific ones of contexts 158, an identifier as to which of the two or more global contexts to refer; communication suite 153 may then set the identifier of all new communication specific ones of contexts 158 to the most recent global context, thereby phasing out the old global contexts and removing the oldest global context when no more communication specific contexts refer to it. In this manner, communication suite 153 may update trusted certificate authorities, certificates, and CRLs without terminating existing communication sessions and without the necessity of a restart.

The example embodiment of computing device 150 may provide several advantages. For example, communication suite 153 may enable a plurality of applications 164 to carry on SSL communication sessions without the necessity of a restart of communication suite 153 or of operating system 152 after an update to CRLs of SSL implementation 154.

Figure 7:
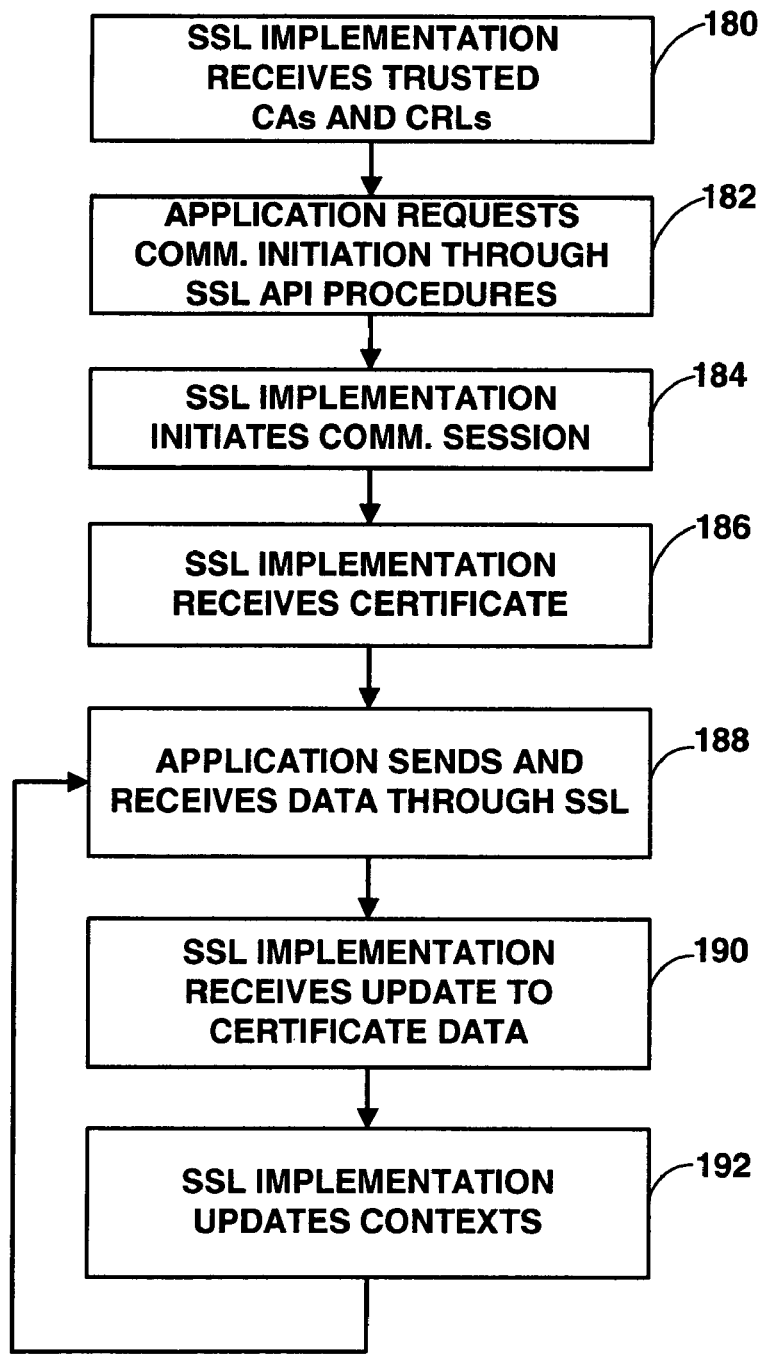
FIG. 7 is a flowchart illustrating exemplary steps for updating contexts for a plurality of communication sessions using an SSL implementation.

FIG. 7 is a flowchart illustrating exemplary steps for updating contexts 158 for a plurality of communication sessions using SSL implementation 154. For exemplary purposes, the method of FIG. 7 is described with reference to computing device 150 of FIG. 6. However, other computing devices may perform the method of FIG. 7 as well. For example, in one embodiment, communication input/output process 30 of FIG. 2 performs a similar method for updating contexts 36.

SSL implementation 154 may first be initialized through communication suite 153. In one embodiment, one of applications 164 initializes SSL implementation 154. In one embodiment, operating system 152 initializes SSL implementation 154, e.g., upon startup of operating system 152. In any case, SSL implementation 154 receives identifiers for one or more trusted certificate authorities (CAs), such as certificate authority 8 of FIG. 1 (180). SSL implementation 154 also receives one or more certificate revocation lists (CRLs) from one or more of the trusted CAs. SSL implementation 154 also receives a certificate from one or more of the trusted CAs. SSL implementation 154 stores this information as certificate information in one or more of contexts 158. "Certificate information" generally refers to information that includes a CRL and/or a certificate.

One of applications 164 may request to begin a communication session over SSL by calling one or more procedures provided by SSL API 156 of SSL implementation 154 (182). SSL implementation 154 then initiates an SSL communication session with a computing device over network 10, identified by receiving data from the procedures called by the one of applications 164 (184). SSL implementation 154 follows the SSL protocol to initiate a communication session, for example, by sending a message to a server indicating SSL version number, supported cipher suites, and similar data; receiving a message from the server; exchanging keys with the server; and so forth.

SSL implementation 154 also receives a certificate from the server as part of the communication session initialization (186). SSL implementation 154 confirms that the certificate is validated by a trusted certificate authority, such as one of the certificate authorities identified at initialization. SSL implementation 154 also determines whether the server's certificate is on any of the one or more CRLs received earlier.

Upon initiating the communication session, the one of applications 164 begins to exchange data with the server (188). At some point during the communication session, communication suite 153 may receive updated certificate data from one or more of the trusted certificate authorities or an administrator. For example, communication suite 153 may receive an updated CRL or updated certificate from an administrator, such as administrator 162 (190). Administrator 162 may, for example, use user interface 166 to instruct communication suite 153 as to the location of an updated CRL in file system 160. Communication suite 153 then updates one or more of contexts 158 to reflect the updates received from administrator 162 (192). In particular, communication suite 153 updates what certificates are to be used, what encryption algorithms are available, what public/private key pair to use, a public key for a peer, session identifiers, whether a particular peer is trustworthy, or other information. Communication suite 153 creates a second context to include the updates to the CRL and applies the second context to existing communication sessions to utilize certificate information, such as the updated CRL, of the second context during the existing communication sessions.

An administrator, such as administrator 162, may configure the one of applications 164 to continue to send and receive SSL communication data through the already-established secure communication session, even when the certificate for the network peer has been revoked by an update to the CRL. In another embodiment, administrator 162 may configure the one of applications 164 to terminate a communication session for which a CRL revokes the communication session peer's certificate. SSL implementation 154 may also receive additional updates to certificate data. When a new one of applications 164 requests a new communication session using SSL API 156, communication suite 153 utilizes the updates to the certificate data, stored in the second context, during initialization of the new communication session by SSL implementation 154. In this manner, SSL implementation 154 utilizes an updated CRL without a restart and without terminating a current communication session.

Although discussed primarily with respect to receiving an update to a CRL, the techniques described herein may also be applied to updating certificate information generally. For example, the techniques described herein may also be used to apply an update to a certificate or to receive a new certificate and update existing certificate information in accordance with the new or updated certificate. Upon receiving an update to an existing certificate for an ongoing communication session, communication suite 153 stores the updated certificate in a second context, as described above, and applies the second context to the current communication session. For example, the update to the certificate may update a public key, an encryption algorithm, an updated validity period, or other information. When the update is to the public key, as one example, communication suite 153 stores the updated public key in the second context, then refers to the second context to retrieve the public key for encrypting data sent to the network peer to which the certificate corresponds. In this manner, communication suite 153 may apply the second context to the communication session to provide secure network communication through the communication session without terminating the communication session.

In one example embodiment, communication suite 153 maintains a set of two directories: a "trusted" directory and a "CRL" directory. The trusted directory includes a set of one or more certificate files associated with communication peers that communication suite 153 treats as trusted. The CRL directory includes a set of one or more CRL files that indicate non-trustworthy communication peers. When communication suite 153 receives an update to a CRL or a new or updated certificate, communication suite 153 stores the update in the appropriate one of the directories and loads data from the files in each of the directories into a second context, which communication suite 153 applies to all existing and new communication sessions.

Figure 8:
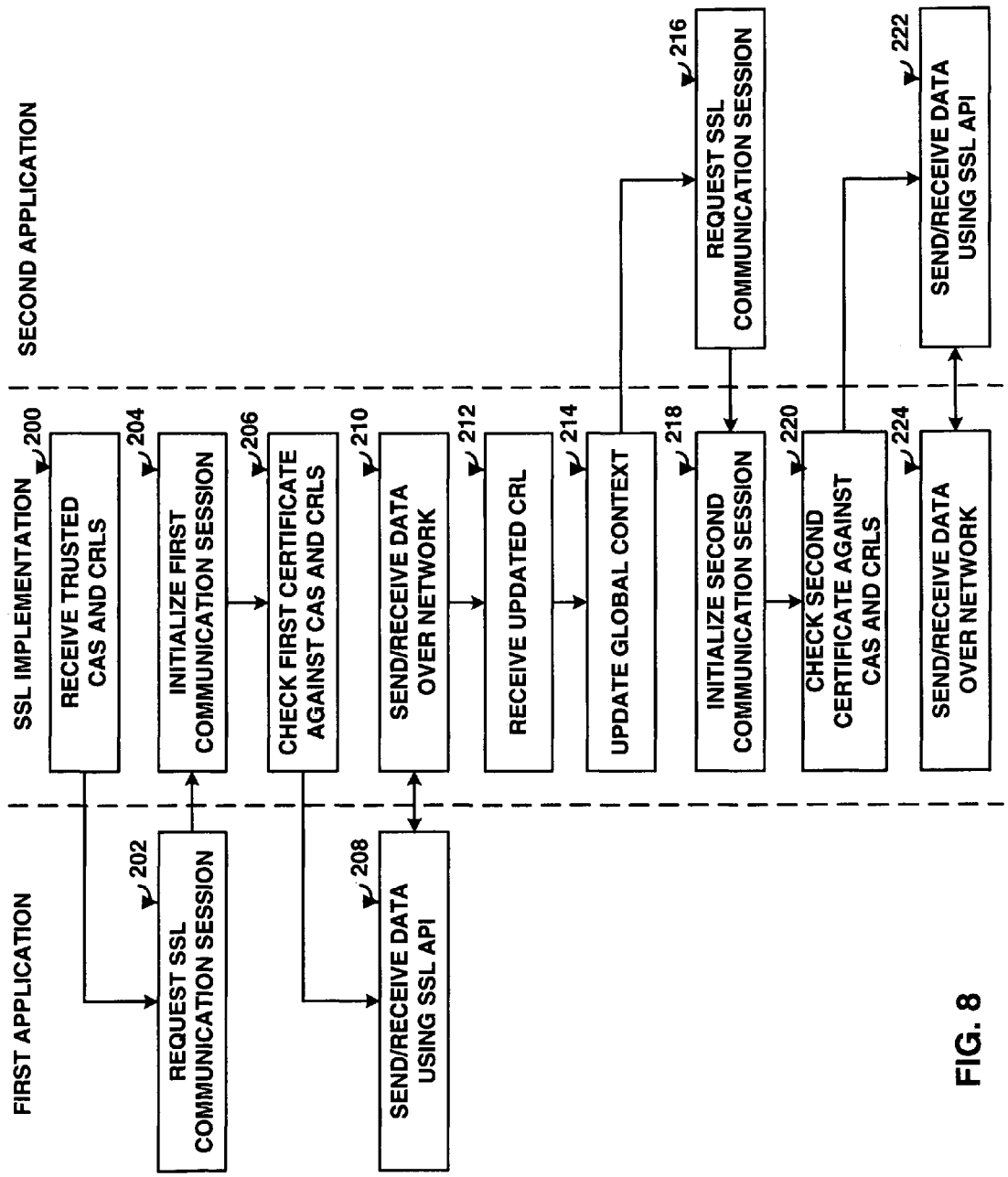
FIG. 8 is a flowchart illustrating an exemplary method for initiating a second communication session for a second application after receiving an updated CRL, and after having already initiated a first communication session for a first application.

FIG. 8 is a flowchart illustrating an exemplary method for initiating a second communication session for a second one of applications 164 after receiving an updated CRL, and after having already initiated a first communication session for a first one of applications 164. For exemplary purposes, the method of FIG. 8 is described with reference to computing device 150 of FIG. 6. However, other computing devices may perform the method of FIG. 8 as well. For example, in one embodiment, communication input/output process 30 of FIG. 2 may perform a similar method for initiating multiple communication sessions for applications 44.

In one embodiment, communication suite 153 uses one or more of contexts 158 as a global context. For example, communication suite 153 may use context 158A as a global context. Communication suite 153 stores data that applies to all communication session in global context 158A. For example, upon receiving identifiers for one or more trusted certificate authorities and CRLs (200), communication suite 153 stores the CRLs and the identifiers for the trusted certificate authorities in global context 158A. Each time SSL implementation 154 initiates a new SSL communication, communication suite 153 causes SSL implementation 154 to check global context 158A to determine, for example, whether a certificate received as part of the communication session is authenticated by one of the trusted certificate authorities or whether the certificate has been revoked by checking the CRLs.

A first one of applications 164 may request to initiate a first communication session using SSL API 156 (202). SSL implementation 154 receives data necessary to initiate this first communication session through SSL API 156. SSL implementation 154 then initiates a first communication session using the SSL protocol (204). As part of this initiation procedure, SSL implementation 154 may receive a certificate from a first server computing device with which the first communication session is taking place. SSL implementation 154 verifies that the certificate is authenticated by one of the trusted certificate authorities identified in global context 158A (206). Communication suite 153 also causes SSL implementation 154 to check the CRLs stored in global context 158A to determine whether the certificate from the first server has been revoked. Communication suite 153 may also maintain a first individual context, such as context 158B, for the first communication session. Communication suite 153 stores information such as the first certificate, a session identifier, a symmetric key, an identifier for an encryption algorithm, a status identifier, or other data corresponding to the first communication session in individual context 158B.

Assuming that the certificate is authenticated and not revoked, the first one of applications 164 may send and receive data as part of the first communication session through SSL API 156 (208). Accordingly, SSL implementation 154 may send and receive data as part of the first communication session over a network to the first server (210). Because the first communication session is initialized, and individual context 158B has been assigned to the communication session, SSL implementation 154 may maintain this first communication session even when global context 158A is updated.

For example, communication suite 153 may receive an updated CRL from, e.g., administrator 162 (212). Administrator 162 may add or modify one or more CRLs to file system 160. Administrator 162 then sends a message to communication suite 153 to use the updated CRL of file system 160 using user interface 166. Administrator 162 may also add or update other information, such as a new trusted certificate authority, a trusted certificate list, or removal of a certificate from a CRL. In any case, communication suite 153 receives the update and modifies global context 158A accordingly (214).

After the update to global context 158A, a second one of applications 164 may request a second SSL communication session using SSL API 156 (216). SSL implementation 154 then initializes the second communication session with a second server computing device over the network (218). This initialization procedure may include receiving a second certificate from the second server. Communication suite 153 causes SSL implementation 154 to check this second certificate against the data in the updated global context 158A (220). For example, SSL implementation 154 determines whether the second certificate is authenticated by a trusted certificate authority as identified in updated global context 158A or whether the second certificate is revoked by a CRL in updated global context 158A. Communication suite 153 also assigns the second communication session an individual context, such as context 158C. Communication suite 153 then stores information specific to the second communication session in individual context 158C. For example, communication suite 153 may store the second certificate, a session identifier, a symmetric key, an identifier for an encryption algorithm, a status identifier, or other data corresponding to the second communication session in individual context 158C.

Assuming that the second certificate is authenticated and not revoked, the second one of applications 164 begins exchanging data as part of the second communication session using SSL API 156 (222). SSL implementation 154 also transmits and receives data as part of the second communication session over the network to the second server (224). Simultaneously, SSL implementation 154 sends and receives data as part of the first communication session as well. When SSL implementation 154 receives data as part of the first communication session, communication suite 153 causes SSL implementation 154 to refer to the individual context for the first communication session, i.e. individual context 158B. When SSL implementation 154 receives data as part of the second communication session, communication suite 153 causes SSL implementation 154 to refer to the individual context for the second communication session, i.e. individual context 158C. Using data in the appropriate one of the individual contexts, SSL implementation 154 encrypts or decrypts data for the corresponding one of applications 164, updates status information, or performs other communication session tasks. In this manner, communication suite 153 causes SSL implementation 154 to maintain a first communication session and a second communication session, wherein the second communication session was initiated after an update to, for example, a CRL, without the necessity of restarting SSL implementation 154 and without the necessity of terminating the first communication session.

Figure 9:
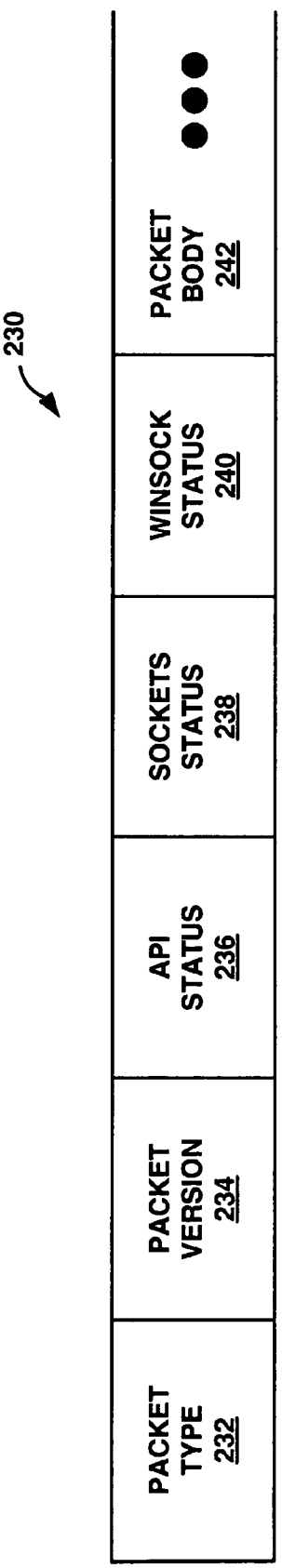
FIG. 9 is a block diagram illustrating an exemplary packet header for packets that may be exchanged between a communication input/output process and emulated communication protocols.

FIG. 9 is a block diagram illustrating an exemplary packet header 230 for packets that may be exchanged between communication input/output process 30 and emulated communication protocols 42. In the example of FIG. 9, packet header 230 is appended to a packet body 242, which may also be referred to herein as a packet payload. For example, communication input/output process 30 may append packet header 230 to a packet body 242 and then transmit the packet to emulated communication protocols 42. The following pseudocode provides an exemplary implementation of packet header 230:

```
struct translator_header {
    WORD2200 packet_type;        /* Tells what packet follows. */
    WORD2200 packet_version;     /* What version of the packet. */
    WORD2200 api_status;         /* Status of API call from Comm_IO */
    WORD2200 sockets_status;     /* Socket call status of API call. */
    WORD2200 winsock_status;     /* Socket call status of API call. */
};
```

In the example of FIG. 9, packet header 230 includes packet type 232, packet version 234, API status 236, sockets status 238, and winsock status 240. Packet type 232 indicates to a receiving process what type of data to expect to retrieve from packet body 242. As an example, packet body 242 may be a packet for discovering a version number of the software corresponding to communication input/output process 30 or emulated communication protocols 42. Accordingly, packet type 232 may indicate that packet body 242 is a packet type for discovering a version number of receiving software. Similarly, packet type 232 may indicate that packet body 242 is a packet type for delivering a version number of transmitting software in response to a request. Another packet type that may be indicated by packet type 232 is a packet for transmitting data over a network, such as network 10.

Packet version 234 informs the receiving process of a version of the packet. For example, a particular packet type may include multiple different versions. In one embodiment, a version of the packet type exists for each version of the software corresponding to communication input/output process 30 or emulated communication protocols 42. API status 238 may include a status identifier for a status of a procedure call made by communication input/output process 30 to second SSL API 24. Exemplary statuses include, for example, active, waiting, locked, completed, failed, or other statuses.

Socket status 238 and Winsock status 240 may include status information for various sockets of communication input/output process 30 and/or emulated communication protocols 42. A socket status may include, for example, closed, listening, syn-sent, established, waiting, or other statuses.

Figure 10:
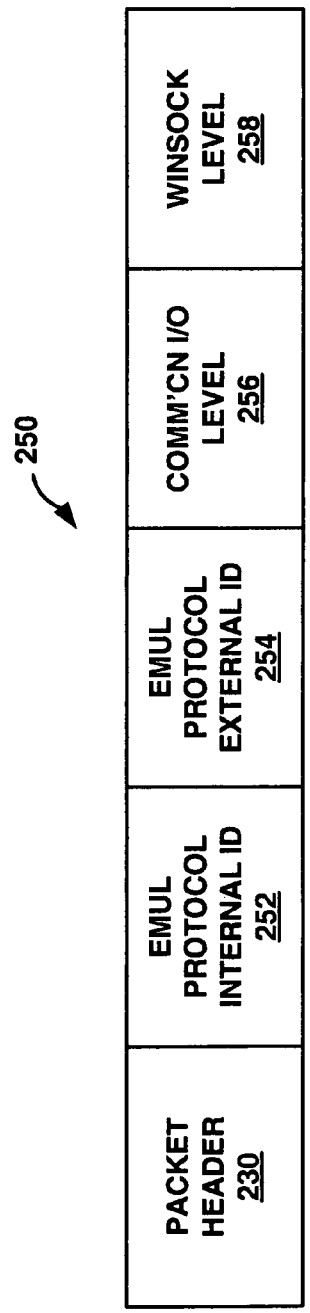
FIG. 10 is a block diagram of an exemplary packet that may be exchanged between a communication input/output process and emulated communication protocols.

FIG. 10 is a block diagram of an exemplary packet 250 that may be exchanged between communication input/output process 30 and emulated communication protocols 42. Packet 250 includes packet header 230, discussed with respect to FIG. 9. Additionally, the body of packet 250, which may correspond to packet body 242 of FIG. 9, includes emulated protocol internal ID 252, emulated protocol external ID 254, communication input/output level 256, and winsock level 258. The following pseudocode provides an exemplary implementation of packet 250:

```
struct info_trans_qb {
    struct translator_header trans_hdr;
    char     emul_protocol_internal_id[12];
    char     emul_protocol_external_id[12];
    char     comm_io_level[12];
    char     winsock_level[12];
};
```

In general, packet 250 may be used to exchange version numbers of software corresponding to communication input/output process 30 and emulated communication protocols 42. In this manner, various versions of communication input/output process 30 and emulated communication protocols 42 negotiate a communication session between each other, i.e. by exchanging packets such as packet 250.

Another exemplary packet may be a packet to send data over network 10. This packet includes packet header 230. The following exemplary pseudocode provides an exemplary implementation of such a packet:

```
struct tcp_send_data_struct {
    struct translator_header trans_hdr;
    struct conn_id          tsu_conn_id;
    struct conn_id          emul_comm_conn_id;
    struct conn_id          comm_io_conn_id;
    struct sockets_debug    sockets;
    WORD2200                reserved_status;
    msg_id_type             msg_id;
    struct conn_id          connection_id;
    WORD2200                status_q_id;
    void                    *tsut_ptr;
    WORD2200                reserved_bytes_transferred;
    byte                    push_flag;
    byte                    urgent_flag;
    byte                    retransmission;
    byte                    time_to_live;
    byte                    type_of_service;
    byte                    wait_flag;
    byte                    tcp_options_len;
    byte                    ip_options_len;
```

```
        WORD2200    data_byte_len;
        char        tcp_options[40];
        char        ip_options[40];
};
```

Methods described herein may be performed in hardware, software, or any combination thereof. For example, methods described herein may be performed by an application specific integrated circuit (ASIC). Methods described herein may also be embodied in a computer readable medium containing instructions. Instructions embedded in a computer readable medium may cause a programmable processor, or other processor, to perform the method, e.g. when the instructions are executed. A computer readable medium may be a computer readable storage medium. Computer readable storage media may include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various embodiments of the invention have been described. These and other embodiments are within the scope of the following claims.

The invention claimed is:

1. A computer-implemented method comprising:
   receiving, with a computer, an initial configuration that specifies a trusted certificate authority;
   receiving digital certificate information that includes a certificate revocation list (CRL) and a digital certificate issued by the trusted certificate authority;
   storing the certificate information in the configuration of the computer;
   with the digital certificate, initiating a secure communication session for a software application executing on the computer;
   receiving, with the computer, an update to the certificate information; and
   updating the configuration to reflect the update to the certificate information without terminating the communication session.

2. The method of claim 1, further comprising:
   maintaining a first context for the communication session; and
   storing the certificate information in the first context, wherein updating the configuration further comprises, upon receiving the update to the certificate information:
      creating a second context that stores a copy of the certificate information from the first context;
      applying the update to the certificate information of the second context; and
      applying the second context to the communication session to provide secure network communication through the communication session without terminating the communication session.

3. The method of claim 2, wherein maintaining a first context comprises:
   storing a connection identifier in the first context, wherein the connection identifier uniquely identifies the communication session with the communication interface process;
   storing a location of a public key certificate file,
   storing a public key and an associated private key for asymmetric key cryptography, and
   storing a cipher suite list file that identifies at least one supported encryption algorithm.

4. The method of claim 1, wherein receiving an update comprises receiving the update to the certificate information from a user.

5. The method of claim 4, further comprising:
   presenting a user interface to the user; and
   receiving the update to the certificate information through the user interface.

6. The method of claim 4, further comprising
   receiving a command to retrieve the update from the user; and
   retrieving the update in response to the command.

7. The method of claim 1, wherein receiving an update comprises receiving a location of a file, wherein the file includes the update to the certificate information.

8. The method of claim 1, wherein receiving, with the computer, an update to the certificate information comprises receiving an update to the CRL.

9. The method of claim 1, wherein receiving, with the computer, an update to the certificate information comprises receiving an update to the digital certificate
   wherein updating the configuration comprises updating a local certificate to reflect the update to the digital certificate, and
   upon receiving a request for a second communication session, referring to the updated local certificate before initiating the second communication session.

10. A computing device comprising:
    a communication suite that includes an implementation of the secure socket layer (SSL) protocol and an application programming interface (API) for the implementation of the SSL protocol; and
    an application that interacts with the SSL API to initiate a communication session in accordance with the SSL protocol;
    wherein the communication suite maintains a first context for the communication session of the application when the communication session is initiated, wherein the first context includes certificate information that includes a certificate revocation list (CRL) and a certificate, and
    wherein the communication suite receives an update to the certificate information and applies the update to the certificate information without terminating the communication session and refers to the updated certificate information for the remainder of the communication session when transmitting or receiving data during the communication session.

11. The computing device of claim 10, wherein the communication suite creates a second context for the communication session, upon receiving the update to the certificate information, applies the update to the certificate information in the second context, and applies the second context to the communication session to provide secure network communication through the communication session without terminating the communication session.

12. The computing device of claim 10, further comprising a user interface to receive the update to the certificate information from a user.

13. The computing device of claim 10 further comprising a file system to store a file that includes the update to the certificate information.

14. The computing system of claim 13, wherein the communication suite receives a location of the file, and in response to a command to apply the update to the certificate information, the communication suite retrieves the file from the location, extracts the update from the file, and applies the update.

15. The computing device of claim 10, wherein the application comprises a communication interface process, further comprising:
an operating system that provides the communication suite in a base computing environment;
an emulation environment running as a process of the operating system; and
an emulated SSL implementation, running in the emulation environment, that provides an emulated SSL API to one or more applications running in the emulation environment,
wherein the communication interface process communicates with the emulated SSL implementation to receive data from the one or more applications and that calls at least one procedure provided by the SSL API of the communication suite to initialize the SSL implementation of the operating system.

16. The computing device of claim 15, wherein the communication input/output process maintains a unique context for each of the one or more applications that initiates a communication session.

17. A device comprising:
means for receiving an initial configuration that specifies a trusted certificate authority;
means for receiving digital certificate information that includes a certificate revocation list (CRL) and a digital certificate issued by the trusted certificate authority;
means for storing the certificate information in the configuration;
means for initiating a communication session for an application using the digital certificate;
means for receiving an update to the certificate information; and
means for updating the configuration to reflect the update to the certificate information without terminating the communication session.

18. The device of claim 17, further comprising:
means for maintaining a first context for the communication session; and
means for storing the certificate information in the first context,
wherein the means to update the configuration further comprises:
means for creating a second context that stores a copy of the certificate information from the first context;
means for applying the update to the certificate information of the second context; and
means for applying the second context to the communication session to provide secure network communication through the communication session without terminating the communication session.

19. The device of claim 18, wherein means for maintaining a first context further comprise:
means for storing a connection identifier in the first context, wherein the connection identifier uniquely identifies the communication session with the communication interface process;
means for storing a location of a public key certificate file,
means for storing a public key and an associated private key for asymmetric key cryptography, and
means for storing a cipher suite list file that identifies at least one supported encryption algorithm.

20. The device of claim 17, further comprising:
means for presenting a user interface to a user;
means for receiving the update to the certificate information through the user interface; and
means for applying the update to the certificate information in response to a command received through the user interface.

* * * * *